United States Patent Office 3,598,625
Patented Aug. 10, 1971

3,598,625
PRODUCTION OF PIGMENTARY
GRADE COLORANTS
Geoffrey R. Buckwalter, Flemington, N.J., assignor to
Cities Service Company, New York, N.Y.
No Drawing. Filed Nov. 14, 1967, Ser. No. 683,011
Int. Cl. C08h 17/14
U.S. Cl. 106—309                              21 Claims

ABSTRACT OF THE DISCLOSURE

Crude colorants, prior to salt grinding, are subjected to attritioning and shearing actions to break down crystalline structure to non-pigmentary, flocculent form. The time required for salt grinding is reduced, and a stronger pigmentary grade product is obtained. When blue shade phthalocyanine crude is so treated and the salt grinding is carried out in the presence of certain non-aromatic organic liquids, a crystallizing red shade phthalocyanine blue is obtained instead of the customary green shade product obtained by conventional salt grinding of the particular crude colorant. A non-crystallizing red shade phthalocyanine blue pigment is obtained when a partly chlorinated phthalocyanine crude is thus treated.

BACKGROUND OF THE INVENTION

This invention relates to the production of pigmentary grade colorants. More particularly, it relates to an improved process for the salt grinding of colorants to pigmentary grade material.

Various conventional techniques are available for the reduction of the particle size of crude colorants to pigmentary grade material. Included among these techniques are such well known processes as salt grinding, ball milling, and acid pasting.

Red shade phthalocyanine colorants produced by the salt grinding technique generally have not been suitable and do not possess satisfactory strength and stability characteristics. Furthermore, due to the practical size limitation of commercial ball mills in which salt grinding might be performed, salt grinding has not been as economical as other methods for producing pigmentary grade red shade phthalocyanine colorants. When it has been desired to produce a satisfactory red shade phthalocyanine pigment, it has been necessary to resort to acid pasting, acid swelling or some other technique. The salt grinding of a blue shade phthalocyanine crude has heretofore been used successfully only in the production of a green shade, pigmentary grade phthalocyanine. This process has not been entirely satisfactory, however, due to the necessary time cycle for achieving the desired quality of pigmentary product.

SUMMARY OF THE INVENTION

It is, therefore, an object of the present invention to provide an improved process for the preparation for pigmentary grade colorants from crude colorants.

It is another object of the present invention to provide an improved process for the salt grinding of colorants to pigmentary grade material.

It is another object of the present invention to provide a process in which the time required for salt grinding of the colorants to pigmentary grade material is reduced.

It is another object of this invention to provide an improved process for the production of pigmentary grade material in which the use of acid is avoided.

It is another object of the present invention to provide a salt grinding technique in which the capital investment for salt grinding may be lowered.

It is a further object of the present invention to provide an improved salt grinding technique in which a pigmentary grade material having approved strength and stability characteristics is obtained.

These and other objects of the present invention have been accomplished by the novel process of the present invention in which crude colorants are subjected to severe attritioning and shearing actions prior to salt grinding. In this preliminary or pre-conditioning step, the attritioning and shearing actions break down the crystalline structure of the crude, non-pigmentary colorant so as to form non-pigmentary flocculates. These flocculates are thereafter salt ground to pigmentary grade material. Pigmentary grade colorants having excellent shade and tinctorial strength properties are obtained.

The present invention permits the reduction in the time required for salt grinding. In addition, the capital investment and overall cost of the salt grinding operation may be reduced. The present invention therefore, provides distinct technical and economical advantages over the previously available techniques.

Quite unexpectedly, the present invention results in the production of a crystallizing red shade phthalocyanine blue pigment by the treatment of a phthalocyanine blue crude in accordance with the present invention. As indicated above, previous salt grinding techniques have produced a green shade phthalocyanine blue pigment. Thus, the present invention permits the use of the salt grinding technique to produce a red shade phthalocyanine blue pigment, either of the crystallizing or non-crystallizing types, heretofore obtainable only by other techniques.

DETAILED DESCRIPTION OF THE INVENTION

Any colorant that is ordinarily produced in a crude form may be converted to pigmentary grade material in accordance with the present invention. The particle size of crude colorants is generally about 50–60 microns or larger. The particle size of pigmentary grade material is usually about 1 micron or less. In conventional salt grinding, therefore, the particle size of the colorant is reduced from about 50–60 microns or larger to about 1 micron or less. During the pre-conditioning step of the present invention, the crystalline structure of the crude colorant are broken down to non-pigmentary flocculent form. This transformation into non-pigmentary form can readily be observed by simple observation under a microscope. In the subsequent salt grinding operation, the pre-conditioned material is reduced to pigmentary size as in conventional salt grinding.

Illustrative of the crude colorants that may be treated in accordance with the present invention are phthalocyanine pigments, quinacridone pigments, vat pigments and the like. Typical phthalocyanine pigments include phthalocyanine blue crude, phthalocyanine green crude, partly chlorinated and brominated phthalocyanine blue and green crudes, and polychlorinated and polybrominated blue and green crudes. Illustrative quinacridone pigments include Du Pont Monastral Red Y and Quindo Magenta, representative of other colors that may be employed in the practice of the present invention include carbazole violets, Hydron Blue RG and Hydron Pink.

Any suitable means may be employed for subjecting the crude colorant to a combination of attritioning and shearing actions prior to salt grinding. It is necessary, of course, that the attritioning and shearing actions be sufficient to break down the crystalline structure of the crude colorant so that a material in non-pigmentary, flocculent form is obtained. This result can be obtained by conventional ball milling, in dry form or with small amounts of salt, e.g. a 1:1 weight ratio, or organic liquids, e.g. 5 or 10% by weight of wetting or dispersing agents. While round balls may be employed, caking of the colorants tend to result. Such caking can conveniently be avoided by the use of various assorted odd-shaped objects, such as nails and the like, as the grinding media. The use of "cyl-pebs" for this purpose is very effective. Cyl-pebs are short, rod-shaped and relatively coarse metallic grinding units or slugs. These slugs are normally made of steel or stainless steel and are approximately 5/8" diameter by 1" or 1½" in length. If the crude colorant tends to cake even in the presence of such slugs, a portion of such slugs can be replaced with assorted materials such as roofing nails, pieces of angle iron and larger nails or railroad spikes. The use of such materials would be dictated by the size of the grinding mill and the degree to which the charged material tended to cake. Other suitable means for imparting the necessary attritioning and shearing actions to the crude colorant include hammer milling and milling by passage of the crude colorant through a pin or stud mill, e.g. one having revolving grinding discs, as in the well-known Alpine Kolloplex or Contraplex mills.

Following the pre-conditioning of the crude colorant, the material is subjected to salt grinding in order to reduce the flocculents to pigmentary grade material. This involves grinding the pre-conditioned colorant with salt, either dry or in the presence of an organic liquid as well known in the art. Illustrative of the well-known aromatic liquids that may be employed are xylene, toluene, trichlorobenzene, aniline, toluidines, such as orthotoluidine, benzylamine, and the like. Illustrative of the well-known nonaromatic liquids suitable for use in the salt grinding operations are conventionally employed, normally water soluble glycols, such as ethylene glycol, hexylene glycol and the like; alcohols, such as ethyl alcohol, isopropanol, and the like; glycol ethers, such as diethylene gylcol, and the like; and such other conventional liquids as acetone, tetrachloroethylene, and the like.

While the quantity of organic liquid that may be employed in the salt grinding operation is not a critical feature of the present invention, sufficient liquid is ordinarily added to wet the particles of the pre-conditioned colorant. For example, quantities of liquid up to about 200% by weight of the preconditioned colorant may conveniently be employed although larger quantities may also be used. The use of liquid quantities at approximately 100% by weight of the pre-conditioned colorant is commonly employed.

In one embodiment of the present invention, the crude colorant is a crude copper phthalocyanine pigment. In this instance, the present invention permits the formation of either the alpha or beta polymorphic form of phthalocyanine pigment. By employing liquids that permit the transformation of colorants from the alpha to the beta phase in the salt grinding of the preconditioned crude, a high tinctorial strength, stable green shade phthalocyanine pigment may be obtained. Such organic liquids are well known in the art. Examples of such liquids include aromatic liquids, such as those listed above; alcohols, such as those listed above; and such other non-aromatic liquids as acetone, tetrachloroethylene, and the like.

The salt grinding of the pre-conditioned phthalocyanine crude may also be carried out in the presence of organic liquids that do not permit or cause the transformation of alpha to beta form. Such liquids are well known in the art and include, but are not limited to, the glycols and glycol ethers set forth above. When employed in the salt grinding of a pre-conditioned crude in accordance with the present invention, these liquids have been found to permit the obtaining of a red shade, crystallizing type phthalocyanine blue pigment. Normally, however, a green shade, phthalocyanine pigment would be obtained by conventional salt grinding in the presence of these liquids. Thus, a preconditioning in accordance with the present invention permits control of the polymorphic form of the resulting phthalocyanine pigment in a manner not heretofore possible by conventional techniques.

If a partly chlorinated blue shade phthalocyanine crude is treated in accordance with the present invention and the salt grinding is carried out in dry form or in the presence of an organic liquid, such as those inidcated above, a red shade non-crystallizing phthalocyanine blue of high tinctorial strength is obtained. For purposes of this invention, the term "partly chlorinated" means a crude phthalocyanine blue having from about 3.5% to 4.5% by weight of chlorine.

By a non-crystallizing pigment is meant one that, upon refluxing in xylene for one hour in a standard, conventional test retains its pigmentary form and does not undergo a reversion to the beta polymorphic form of pigmentary product. In order to obtain a crystallizing red shade phthalocycanine blue pigment, it is necessary that the salt grinding be carried out in the presence of an organic liquid that does not cause a change in the polymorphic form of the pigmentary product from the alpha to the beta form as discussed above.

While temperature and pressure are not critical features of this invention, the pre-conditioning step will ordinarily be carried out at/or about room temperature and at atmospheric pressure. Conventional operating conditions prevail in the salt grinding step. The time required for the initial attritioning and shearing of the crude colorant will, of course, depend upon the particular size and type of equipment employed. While the time is not critical, the crude colorant can conveniently be ground for from about two to about six hours in a ball mill to insure that the crystalline structure has been broken up and transformed into flocculents. Milling for longer periods of time does not appear to result in any appreciable improvement in the properties of the pigmentary product. Salt grinding of the pre-conditioned crude may be carried out in conventional mixing equipment, suih as a double or single arm mixer or blender, and the like. In comparison with conventional salt grinding employing the same equipment, it has been found possible to significantly reduce the overall operating time by means of the pre-conditioning of the present invention.

The present invention is hereinafter described with reference to specific examples thereof. These examples are presented for illustrative purposes only, and are not intended in any way to limit the scope of the invention herein described, the novel features of which are set forth in the appended claims.

EXAMPLE I

In a one gallon ball mill containing a combination of metallic pieces as the milling media, 100 parts of crude copper phthalocyanine were charged. The mill was rotated at a speed of 60 r.p.m. for approximately eight hours. The content of the mill were discharged and mixed in a mechanical mixer with 900 parts of micropulverized salt and 100 parts of a hexylene glycol until pigmentary strength was developed. A red shade crystallizing, alpha form phthalocyanine blue of excellent quality was obtained.

EXAMPLE II 100 parts of crude, Monastral Fast Blue B crude, type 3 containing 3.5% to 4.5% chlorine was charged to the ball mill of Example I containing an assortment of metallic pieces as the milling media. The mill was rotated at a speed of 65 r.p.m. for a period of six hours during which the crude colorant was subjected to an attritioning and shearing action. The mill was then discharged, and the contents were mixed in a mechanical mixer with a micropulverized salt and a glycol solvent for a period of 6 hours in order to develop pigmentary strength. A pigmentary grade, non-crystallizing, alpha form red shade phthalocyanine blue of excellent quality and stability was obtained.

EXAMPLE III

A charge of 100 parts of crude, non-pigmentary carbazole violet was milled in the ball mill containing assorted odd-shaped objects as the milling media for six hours at a speed of 60 r.p.m. The charge was then removed from the mill and mixed with 900 parts of micropulverized salt and 110 parts of hexylene glycol in a mechanical mixer for 7 hours in order to develop pigmentary strength. A pigmentary grade carbazole violet of excellent quality and stability was obtained.

EXAMPLE IV

In the ball mill rotated at 60 r.p.m. and containing assorted metallic objects as the milling media, 100 parts of crude polychlorinated phthalocyanine were subjected to attritioning and shearing actions for six hours. The thus-conditioned material was then mixed in a mechanical mixer with 1000 parts of salt and 95 parts of diethylene glycol to develop pigmentary strength. The resulting pigmentary phthalocyanine green was of excellent quality and stability was obtained.

EXAMPLE V

In similar fashion, 100 parts of crude phthalocyanine were charged to the ball mill containing an assortment of metallic pieces suitable to impose attritioning and shearing actions on the crude pigment. The mill was rotated at a speed of 60 r.p.m. for six hours. The mill was thereafter discharged, and the contents were mixed with 900 parts of micropulverized salt and 90 parts of aniline in a mechanical mixer until pigmentary strength was developed. The resulting product, having excellent shade and tinctorial characteristics, was a green shade phthalocyanine blue.

The present invention, thus permits the obtaining of stable pigmentary products having very desirable shade and tinctorial qualities. Economical advantages over conventional salt grinding of crude colorants is achieved by a shortening of the necessary grinding time, and the ability to employ conventional sized milling equipment in an economically feasible manner. In addition, the pre-conditioning set forth herein permits the subsequent salt grinding of a copper-phthalocyanine crude in a proper organic liquid as set forth above to obtain a crystallizing, alpha form red shade phthalocyanine blue, whereas heretofore only green shade phthalocyanine blue was obtainable by salt grinding this crude. In view of the considerable waste acid disposal problems arising out of the use of acid swelling, acid pasting and similar techniques to produce crystallizing red shade phthalocyanine blue pigments, the present invention offers a highly desirable alternative from a public interest standpoint as well as one in which products of outstanding characteristics are achieved. Likewise, the present invention offers the industry a highly desirable means for controlling the polymorphic form of crude colorants undergoing salt grinding to pigmentary grade products.

It will be appreciated by those skilled in the art that various changes and modifications can be made in the invention as described herein without departing from the nature and scope of the invention as set forth in the appended claims.

I claim:

1. A process for the preparation of pigmentary grade colorants from crude colorants comprising:
   (a) subjecting the crude colorants to attritioning and shearing actions sufficient to break down the crystalline structure of the crude colorant to non-pigmentary flocculent form; and
   (b) salt grinding the thus-treated crude colorant to reduce the flocculates to pigmentary grade material.

2. The process of claim 1 in which the attritioning and shearing actions are imparted to the crude colorant by ball milling.

3. The process of claim 2 in which the ball milling employed is dry ball milling.

4. The process of claim 1 in which the salt grinding is carried out in the presence of an organic liquid.

5. The process of claim 1 in which the crude colorant is selected from the group consisting of phthalocyanine pigments, vat pigments, quinacridone pigments, and carbazole violets.

6. The process of claim 1 in which the crude colorant is a crude copper phthalocyanine pigment.

7. The process of claim 6 in which the salt grinding is carried out in the presence of an organic liquid that will permit the transformation of the colorant from the alpha to the beta polymorphic form and the resulting pigmentary product is a green shade, beta form phthalocyanine blue pigment.

8. The process of claim 7 in which the organic liquid is xylene.

9. The process of claim 7 in which the organic liquid is aniline.

10. The process of claim 7 in which the organic liquid is benzylamine.

11. The process of claim 7 in which the organic liquid is acetone.

12. The process of claim 7 in which the organic liquid is an alcohol.

13. The process of claim 12 in which the organic liquid is ethyl alcohol.

14. The process of claim 6 in which the salt grinding is carried out in the presence of an organic liquid that will not permit the transformation of the colorant from the alpha to the beta polymorphic form and the resulting pigmentary product is a red shade, crystallizing type, alpha form phthalocyanine blue pigment.

15. The process of claim 14 in which the organic liquid is taken from the group consisting of glycol and glycol ethers.

16. The process of claim 15 in which the organic liquid is a glycol.

17. The process of claim 16 in which the organic liquid is ethylene glycol.

18. The process of claim 16 in which the organic liquid is hexylene glycol.

19. The process of claim 15 in which the organic liquid is a glycol ether.

20. The process of claim 19 in which the organic liquid is diethylene glycol.

21. The process of claim 1 in which the crude colorant is a partly chlorinated blue shade phthalocyanine crude and the resulting pigment is a red shade, non-crystallizing phthalocyanine blue.

References Cited

UNITED STATES PATENTS

| | | | |
|---|---|---|---|
| 2,857,400 | 10/1958 | Cooper | 260—314.5 |
| 3,051,718 | 8/1962 | Wheeler | 106—288Q |
| 2,933,505 | 4/1960 | Jackson | 106—288Q |
| 3,030,370 | 4/1962 | Jackson | 106—288Q |
| 3,148,075 | 9/1964 | Ehrich | 106—288Q |
| 3,148,191 | 9/1964 | Jackson et al. | 106—288Q |
| 3,288,621 | 11/1966 | Barron et al. | 106—288Q |
| 3,386,843 | 6/1968 | Jaffe et al. | 106—309 |

JAMES E. POER, Primary Examiner

U.S. Cl. X.R.

106—288Q